United States Patent
Weir et al.

[15] 3,658,508
[45] Apr. 25, 1972

[54] PROCESS FOR CONTROLLED REDUCTION ROASTING OF NICKELIFEROUS IRON OXIDE ORES

[72] Inventors: Donald Robert Weir; Safdar Waliullah, both of Saskatchewan, Alberta, Canada

[73] Assignee: Sherritt Gordon Mines Limited, Toronto, Ontario, Canada

[22] Filed: Feb. 11, 1970

[21] Appl. No.: 10,577

[52] U.S. Cl. ................................75/26, 75/34, 75/82, 75/101
[51] Int. Cl. ..................C21b 1/02, C21b 15/00, C22b 3/00
[58] Field of Search.................75/9, 26, 34, 82, 103, 21, 75/101

[56] References Cited

UNITED STATES PATENTS

| | | | |
|---|---|---|---|
| 3,471,285 | 10/1969 | Rolf | 75/80 |
| 2,998,311 | 8/1961 | Illis | 75/82 |
| 3,146,091 | 8/1964 | Green | 75/82 |
| 3,503,735 | 6/1970 | Beggs | 75/82 |
| 3,190,744 | 6/1965 | King | 75/34 |
| 3,141,765 | 7/1964 | Brown | 75/103 |
| 3,311,466 | 3/1967 | Curlook | 75/82 |
| 3,256,060 | 6/1966 | Globus | 75/82 |

Primary Examiner—Winston A. Douglas
Assistant Examiner—Peter D. Rosenberg
Attorney—Frank I. Piper and Arne I. Fors

[57] ABSTRACT

Nickeliferous iron bearing oxidic ores are treated to convert contained nickel values to a leachable form with a minimum accompanying conversion of contained iron values to metallic form. Ore particles are suspended in a moving gas stream and are heated, in contact with a gaseous reductant, e.g. hydrogen, in a confined reaction zone, for a period of time not more than about 15 seconds and preferably not more than about 7 seconds.

7 Claims, 1 Drawing Figure

Patented April 25, 1972 3,658,508
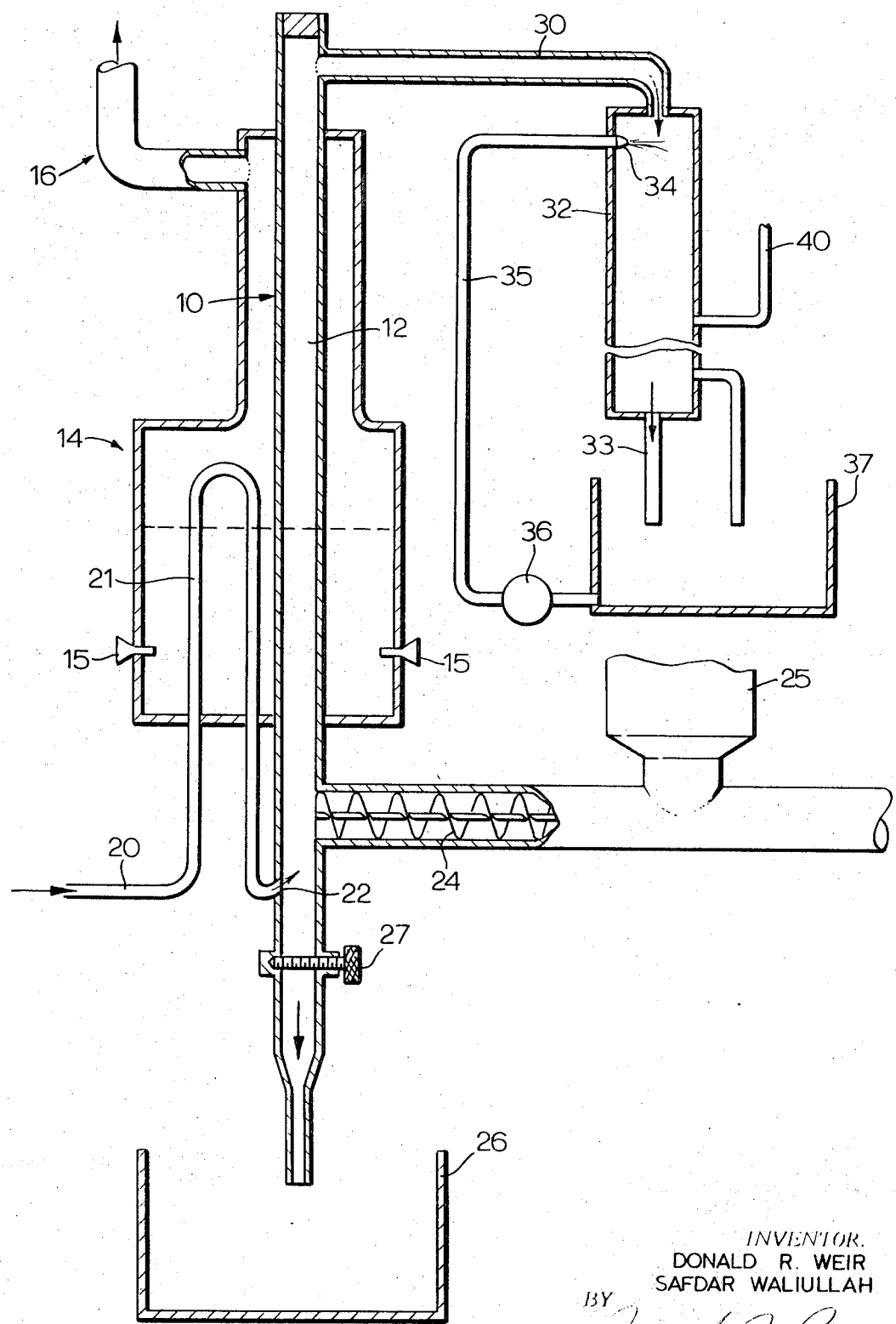
INVENTOR.
DONALD R. WEIR
SAFDAR WALIULLAH
BY
Frank T. Piper
Agent

PROCESS FOR CONTROLLED REDUCTION ROASTING OF NICKELIFEROUS IRON OXIDE ORES

This invention relates to the treatment of oxidic nickel and iron bearing materials including particularly nickeliferous limonite and serpentine ores. More specifically, it is concerned with an improved process for controlled reduction roasting of such materials to enable selective extraction of contained nickel therefrom by leaching with aqueous ammoniacal solutions.

A large proportion of the world's nickel resources are contained in oxidic and siliceous ores such as limonitic laterites and garnierite and serpentine. The recovery of the nickel from these materials has long presented serious problems to the metallurgical industry. The problems result, primarily, from the fact that oxidic ores of this type generally contain only relatively small amounts of nickel, usually in the order of about 1–2 percent by weight, and concentration of the nickel cannot be achieved by means of the relatively inexpensive conventional ore beneficiation methods. It is necessary to treat the entire bulk of the ore metallurgically for the recovery of the relatively small amounts of contained nickel values with the result that huge quantities of ore must be handled to obtain a commercially practical rate of nickel production.

One process, known as the Nicaro process, which has been commercially employed for the recovery of nickel from lateritic ore, involves roasting the ore under reducing conditions using solid reductants such as coal or coke fines or a reducing gas such as hydrogen or carbon monoxide or mixtures thereof to reduce the nickel oxide in the material to crude metallic state. The reduced ore is leached in the presence of free oxygen with an aqueous ammoniacal ammonium carbonate solution to extract the metallic nickel and dissolve it in the leach solution as nickel ammine carbonate. Undissolved residue is separated from the leach solution and the decanted solution is treated for the recovery of the dissolved nickel values.

The conventional method for carrying out the ore reduction stage of the Nicaro process involves the use of vertical multiple hearth furnaces. While these methods are technically feasible, because of the very large tonnages of ore that must be treated to obtain a commercially practical rate of production of nickel, batteries of very large, e.g. 20 to 25 foot diameter, 50 to 60 foot high, multiple hearth furnaces are required to handle the large volume that must be treated. The capital and operating costs of such equipment are high. Further, the close control of reducing conditions which is required in order to obtain optimum selective reduction of the nickel values in the ore is difficult to achieve because of the relatively poor distribution of heat, the difficulty in obtaining intimate gas-solids contact and inefficient heat transfer in such furnaces.

Fluid bed roasting methods have been employed with some degree of success in the reduction roasting of iron ores to produce metallic iron. However, the equipment and operating costs for fluid bed roasters are also very high, particularly where a very large roasting capacity is required. Further, with conventional fluid bed roasting methods, it is difficult to obtain the degree of control roasting conditions, particularly of roasting retention time, that is required in the roasting of laterite ores to obtain selective reduction of nickel values to leachable form with minimum reduction of iron to metallic form. Also, because of the inherent high bound moisture content of laterite ores, there is a strong tendency for such ores to pelletize during fluid bed roasting. This aggravates the problem of roasting time control of different sized particles to obtain selective reduction of nickel values.

The principal object of the present invention is to provide a process which substantially decreases the equipment cost required for controlled reduction roasting of oxidic nickel and iron bearing ores. Another object is to provide a method for reduction roasting of such ores which is both economic in operation and easily controllable to obtain optimum conversion of the nickel values to leachable form with minimum accompanying reduction of the iron content of the ore to metalic form.

The invention is based on the discovery that the nickel values in nickeliferous, iron bearing oxide ores can be selectively reduced to leachable form with minimum accompanying reduction of iron values to metallic form by suspending finely divided ore particles in a moving gas stream and contacting the moving suspended particles with a gaseous reductant, such as hydrogen, at an elevated temperature for a very short period of time, e.g. for a few seconds, as opposed to the roasting times of minutes or hours employed in conventional reducing-roast methods. That is, according to the invention, selective reduction of nickel values is obtained by closely controlling the time element rather than controlling the reduction reaction equilibrium factors as is the case with the prior art methods.

In the practice of the invention, finely divided ore particles are suspended in a gas stream containing at least sufficient gaseous reductant to reduce the nickel values in the suspended particles to metallic nickel. The gas-ore suspension is continuously moved through a confined reaction zone maintained at a temperature in the range of about 700° F. to about 1,700° F. Gas and suspended particles are continuously discharged from the reaction zone and reacted particles are continuously separated from the discharge gas stream. The gas stream flow rate through the reaction zone is controlled such that the total period of retention of the suspended ore particles in the reaction zone is not more than about 15 seconds and the ore-reductant ratio of the suspension and the reaction zone temperature are controlled and correlated such that, during the period of retention, nickel values in the suspended ore particles are converted to a leachable form with a minimum accompanying reduction of iron values to metallic form.

It has been found that with proper control and correlation temperature and the ore-reductant ratio, the selective reduction of nickel to leachable form can be readily obtained with reactor retention times of less than 7 seconds and, in most cases, from about 3–5 seconds retention time. Since retention times of 1–4 hours are required in the conventional methods using multiple hearth furnaces or similar equipment, it can be appreciated that the equipment requirements for the process of the invention are substantially less than those for the conventional methods for handling the same throughput of ore.

The process of the invention can be carried out in any suitable form of transport reactor which provides a confined reaction zone and means for forming and conveying the gas-ore suspension through the reaction zone within a predetermined time period under controlled conditions of temperature, ore feed rate and carrier gas composition.

The invention is further discussed with reference to the accompanying drawing which is a schematic view of an apparatus for carrying out the process of the invention.

The apparatus illustrated includes a tube reactor, indicated generally at 10, defining an elongated confined reaction zone 12. Reactor 10 is surrounded by a combustion chamber 14 which is provided with natural gas burners 15 for heating the reactor 10. Stack 16 is connected to chamber 14 for effecting removal of combustion gases from the combustion chamber. Carrier gas inlet conduit 20 has a looped portion 21 within the combustion chamber for preheating the carrier gas and is connected to the lower end of the reactor as indicated at 22.

Connected to the reactor 10 at a point above the carrier gas conduit connection 22 is a metering worm conveyor 24 which permits finely divided ore to be fed into the reactor where it is picked up by the hot carrier gas stream entering the reaction through conduit 20. Hopper 25 is provided for feeding ore into the conveyor.

The reactor 10 extends below the conduit connection 22 and opens into a catch pot 26 which collects ore particles not picked up by the carrier gas stream. A valve 27 is provided below connection 22 to permit the reactor 10 to be closed off at its lower end during normal operation.

A gas-ore suspension outlet conduit 30 is connected at the upper end of reactor 10. Conduit 30 connects with wet scrubber 32 which serves to separate reacted ore particles from the reactor exit gas stream. Scrubber 32 includes a slurry outlet line 33 and spray nozzle 34 which is connected via conduit 35 with slurry recirculating pump 36 and reduced ore receiving bin 37. Stack 40 is provided for removal of exit carrier gases after scrubbing to remove the reduced ore particles.

The process of the invention is applicable to any oxidic nickel and iron bearing materials in which separation of the nickel values from the iron values can be obtained by selective reduction of the nickel values followed by leaching such as with aqueous ammoniacal solutions.

The particular ores contemplated for treatment by the process are primarily the high iron or limonitic laterites and the high magnesium ores such as serpentine or garnierite. The following table illustrates the normal range of composition of each of these types of ore:

TABLE 1

|   | Serpentine (Garnierite) ores % by weight | Limonite ore % by weight |
|---|---|---|
| Ni | 1.00–4.0 | 0.10 – 3.00 |
| Co | 0.05–0.08 | 0.05 – 0.25 |
| Fe | 8.00–18.00 | 35.00 – 60.00 |
| Cr | 0.8–2.00 | 1.00 – 3.00 |
| MgO | 20.00–38.00 | 0.20 – 6.00 |
| $Al_2O_3$ | 1.00–6.00 | 0.40 – 10.00 |
| $SiO_2$ | 40.00–35.00 | 1.30 – 6.00 |
| CaO | 0.10–2.00 | 0.06 – 0.10 |
| MnO | 0.10–1.00 | 0.30 – 2.50 |

Ores of these types occur in large deposits in Cuba, New Caledonia and the Philippines, for example. The raw ore normally contains 10–50 percent free moisture as well as water of hydration. Prior to treatment by the process of the invention, the ore is first dried by conventional drying procedures to lower the free water content preferably to below about 5 percent by weight. The coarse fraction of the dried ore is comminuted to substantially 100 percent minus 65 mesh standard Tyler screen and preferably to 80–90 percent minus 325 mesh.

In the operation of the process, finely divided dried ore particles are suspended in a carrier gas stream and fed through a confined reaction zone wherein the selective reduction of nickel values is effected. The carrier gas, which contains gaseous reductants such as hydrogen and/or carbon monoxide, is supplied to the reaction zone at a rate such that the gas velocity is sufficient to suspend the ore particles and carry them through reaction zone. The ore throughput capacity of the reaction zone is directly proportioned to the pressure of the carrier gas stream in the reaction zone. Accordingly, in order to ensure optimum throughput for any system utilizing the process of the invention, it is preferred to control the gas supply rate and other related factors to maintain an elevated pressure, e.g. in the order of 50–700 p.s.i., within the reaction zone.

The carrier gas can be produced, for example, by reforming of naphtha with scrubbing to remove $CO_2$ or by the partial combustion of heavy fuel oil in a combustion chamber. This latter procedure permits control of the reductant content of the carrier gas through control of the amount of oxygen supplied for combustion. Also, with this procedure, the carrier gas temperature may be easily controlled by removal of heat, e.g. in a waste heat boiler, as necessary to maintain the desired temperature.

The carrier gas must, of course, contain at least the stoichiometric amount of reductants, usually $H_2$ and CO, required to reduce the nickel oxides (and cobalt oxides if present) in the suspended ore particles to a form soluble in the leach solution as well as to reduce the iron oxide constituent in the feed to magnetite. Preferably, the gas composition is adjusted to ensure a large excess of reductant over the theoretical requirements of the nickel oxide and iron oxide. Carrier gas containing at least 75 percent by volume hydrogen is preferred. When a large excess of reductant is used, of course, provision must be made for recycling non-consumed reductants to the reactor or for recovery of calorific values in the exit gas such as in a fired waste heat boiler.

The length of the reaction zone must be selected so that that carrier gas stream flow rate through the reaction zone can be controlled such that the total period of retention of gas suspended particles in the reaction zone is not more than about 15 seconds and preferably is within the range of 1–7 seconds. For most materials which can be treated by the process, with retention times greater than 15 seconds it is not generally possible to rely primarily on the time element as the means of maintaining the selectivity of the reduction reaction. That is, as retention time increases beyond about the 15 second limit, more and more iron tends to be reduced to the metallic state along with the nickel, and the process becomes less and less effective. Also, even with retention times between about 8 and 15 seconds, in most cases some control over the $H_2O/H_2$ and $CO_2/CO$ ratios in the reaction zone is desirable in order to obtain optimum selectivity of nickel reduction. This can be achieved by addition of steam to the carrier gas stream as required to maintain the $H_2O/H_2$ ratio between about 0.2 and about 1.0. With retention times in the preferred range of 1–7 seconds selectivity is controlled by the time element and the reaction equilibria conditions ($H_2O/H_2$ and $CO_2/CO$ ratios in the reaction zone are relatively unimportant.

Retention time in the reaction zone is determined by the carrier gas velocity and the reaction zone length. The velocity must be sufficient to suspend the ore particles and transport them through the reaction zone. For ores of substantially 100 percent minus 65 mesh and 80–90 percent minus 325 mesh particle size, a velocity of at least 5 feet per second is required. Preferably a velocity of about 7–15 feet per second is employed.

The precise retention time required to effect the desired reduction in any given case will depend primarily on the ore particle size and composition, the reductant/ore ratio and the reaction temperature. In order to reduce the contained nickel oxide, the ore particles must be heated in the reaction zone to a temperature within the broad range of 700°–1,700° F. However, the most rapid reduction rate consistent with low reductant consumption by iron values in the ore is obtained at temperatures within the range of 900°–1,100° F. Heating can be effected by using hot carrier gas and/or by externally heating the reactor adjacent the reaction zone.

At any fixed temperature within the indicated operable range, there is an inverse relationship between the retention time in the reaction zone and the reductant to ore ratio; the higher the reductant to ore ratio, the shorter the retention time. For example, with one limonite ore, at a roasting temperature of 1,350° F., a 90 percent nickel extraction was obtained with about 1 second retention time where the reductant/ore ratio was 7 SCF $H_2$/lb of ore and with about 5 seconds retention time where the ratio was 2.5 SCF $H_2$/lb of ore. The actual reductant to ore ratio for any specific case will depend primarily on practical apparatus and operating considerations. For a once-through system, i.e. one in which unconsumed reductant is not recycled, ratios within the range of 2 to 8 SCF $H_2$/lb of ore are employed. For systems using recycle of reductant, reductant/ore ratios in the order of 15–30 are preferred.

It is essential, in order to obtain selective reduction of nickel values with minimum accompanying reduction of iron values to metallic form, that ore particle retention time in the reaction zone be less than about 15 seconds. Generally, for limonitic laterite and blends of limonitic and serpentinic laterites, the desired reduction can be obtained in less than 8 seconds retention time and, in most cases, with proper control of temperature and ore-reductant ratio, within from about 1 to 7 seconds retention time in the reaction zone.

An important feature of the process is that for any given gas velocity which is sufficient to suspend and transport the ore particles through vertically disposed sections of the reaction zone, the smaller ore particles are transported through such reaction zone sections faster than the larger particles. This permits control over retention time of ore particles of different sizes, whereas in conventional multiple hearth or fluid bed roasting, all particles are retained in the reaction zone for substantially the same time regardless of particle size and over-roasting of small particles and under-roasting of large particles is a serious problem.

The solids-gas suspension exiting from the reaction zone is passed through a dust collection system employing a scrubber as shown in the drawing or other conventional means such as cyclones and/or electrostatic precipitators to separate the reduced calcine product of the process from the exit carrier gas. This calcine preferably is cooled and quenched directly in recycled leach liquor and the resulting slurry is passed to a leaching operation wherein the calcine is leached in aqueous ammoniacal solution to selectively leach the nickel content from the iron content of the calcine. Suitable leaching and related nickel recovery processes are described in U.S. Pat. No. 3,141,765 and Canadian Pat. No. 811,078. Exit carrier gas may be treated for separation of unreacted reductant gases which are then recycled to the reactor, and the final exit gas may be used for drying or any other operations associated with the ore reduction operation where waste heat can be utilized.

The following example illustrates the operation of the process of the invention:

EXAMPLE I

The reactor apparatus used in this test was similar to that illustrated in the drawing. The reactor was a stainless steel pipe having an inside diameter of 2 inches and a length of about 12 feet. The pipe was externally heated by a combustion chamber utilizing natural gas burners.

Finely divided dry laterite ore (90 percent minus 325 mesh and 100 percent minus 65 mesh standard Tyler screen) was continuously fed at a rate of 24 pounds per hour into the 2 inch pipe by means of a screw conveyor. The ore contained 1.24 percent nickel, 0.12 percent cobalt, 35.4 percent iron and 2 percent free $H_2O$ percent by weight.

At the same time, the ore was fed into the pipe, carrier gas preheated to 1,100° F. and containing (percent by volume) $H_2$-55 g, $N_2$-44 g and $CO+CO_2$-balance. The carrier gas was supplied at a rate sufficient to provide a gas velocity inside of the reactor tube of 14 feet per second. The reductant (hydrogen) ore ratio (SCF $H_2$/lb) was 7.2.

The ore was entrained in the carrier gas as soon as the gas reached the ore feed-in opening and was transported through the pipe. The estimated average ore particle retention time based on gas velocity and ore particle size distribution was 2 seconds. The temperature within the reaction zone was measured at 1,400° F.

After feeding the ore through the reactor, reduced ore product was collected in water. The reduced material, which analyzed (percent by weight) Ni-1.48, Co-1.40, Fe-40.9 (3.41 percent metallic Fe), was leached under oxidizing conditions in an ammonia-ammonium carbonate leach solution at room temperature and atmospheric pressure. 90.5 percent of the nickel content of the reduced ore and 68.7 percent of the cobalt content was extracted.

EXAMPLE II

In this example, the same reactor apparatus and procedures were used as in Example I. The ore contained (percent by weight) 1.35% nickel, 0.118% cobalt, 41.9% iron and 1.4% free $H_2O$ and was 90% minus 325 mesh and 100% minus 65 mesh standard Tyler screen. The carrier gas was preheated to 800° F. and contained (% by volume) hydrogen-75%, nitrogen-23% and carbon monoxide plus carbon dioxide - balance. The carrier gas was supplied at a rate sufficient to provide a gas velocity inside of the reactor tube of 8 feet per second. The reductant (hydrogen) ore ratio (SCF $H_2$/lb. ore) was 15. The estimated average ore particle retention time based on gas velocity and ore particle size distribution was about 4.0 seconds. The temperature within the reaction zone was measured at 1,000° F.

The reduced material, which analyzed (% by weight) Ni-1.5, Co-0.126, Fe-44.6 (9.02 percent metallic Fe) was leached in an ammonia-ammonium carbonate leach solution in the same manner as described in Example 1. 88.2 percent of the nickel content of the reduced ore and 55.4 percent of the cobalt content was extracted.

What we claim as new and desire to protect by Letters Patent of the United States is:

1. The process for treating nickeliferous ores to enable selective extraction of contained nickel values therefrom by leaching with aqueous ammoniacal solution which comprises forming a suspension of finely divided ore particles in a gas stream containing at last sufficient gaseous reductant to reduce the nickel values in the suspended ore particles to metallic nickel, continuously moving the gas-ore suspension through a confined reaction zone while maintaining the temperature thereof in the range of 700°-1,700° F., continuously discharging the gas-ore suspension from the reaction zone and continuously separating the gas from the reacted ore particles, controlling the gas stream flow rate through the reaction zone such that the total period of retention of the gas-ore suspension in the reaction zone is not more than about 15 seconds, and controlling and correlating the ore-reductant ratio of the suspension and the specific reaction zone temperature to effect conversion of nickel values of the said nickeliferous ores to a leachable form with a minimum accompanying reduction of iron values to metallic form during said period of retention.

2. The process according to claim 1 in which the carrier gas pressure in the reaction zone is maintained at an elevated level in the range of 50 to 700 p.s.i.

3. The process according to claim 1 in which the carrier gas contains at least about 75 percent by volume hydrogen.

4. The process according to claim 1 wherein the temperature within the reaction zone is maintained within the range of 900° to 1,100° F.

5. The process according to claim 4 wherein the ratio of reductant to ore in the gas-ore suspension supplied to the reaction zone is in the range of 15 to 30 standard cubic feet of hydrogen per pound of ore.

6. The process according to claim 5 wherein the ore retention time within the reaction zone is between about 1 and about 7 seconds.

7. The process according to claim 4 wherein the ore retention time within the reaction zone is between about 8 and about 15 seconds and the $H_2O/H_2$ ratio within the reaction zone is maintained between about 0.2 and about 1.0 by addition of steam to the carrier gas stream.

* * * * *